June 8, 1937. E. L. ANDERSON Re. 20,394

FAN

Original Filed March 29, 1929 2 Sheets-Sheet 1

Inventor
EDWARD L. ANDERSON,
Bachman & Bachman
Attorneys

June 8, 1937. E. L. ANDERSON Re. 20,394

FAN

Original Filed March 29, 1929 2 Sheets-Sheet 2

Inventor

EDWARD L. ANDERSON

By Toulmin & Toulmin

Attorneys

Reissued June 8, 1937

Re. 20,394

UNITED STATES PATENT OFFICE 20,394

FAN

Edward L. Anderson, Grosse Ile, Mich., assignor to American Blower Corporation, Detroit, Mich., a corporation of Delaware Original No. 1,910,225, dated May 23, 1933, Serial No. 351,077, March 29, 1929. Application for reissue October 24, 1935, Serial No. 46,633

10 Claims. (Cl. 230—114)

My invention relates to fans.

It is the particular object of my invention to provide means of controlling the inlet air of a constant speed fan so as to vary the output of air without varying the fan speed.

It is a further object to provide means of increasing the rotatable movement of the incoming air in order to facilitate the entry of the air into the interior of the fan.

It is still a further object of my invention to provide, in combination with this inlet control means, a construction to bring about a Venturi action and an injector action between the inlet air and the back pressure of the air in the casing already in the fan casing.

It is an additional object to provide a fan of the side inlet radial delivery type known as a high-speed fan which is driven by a standard motor at constant speed; with this combination I provide a Venturi inlet with streamlined air control blades which not only control the amount of air entering through the air inlet, but also control the whirling of the air.

Referring to the drawings, Figure 1 is a side elevation from the inlet side of the fan.

Figure 1:
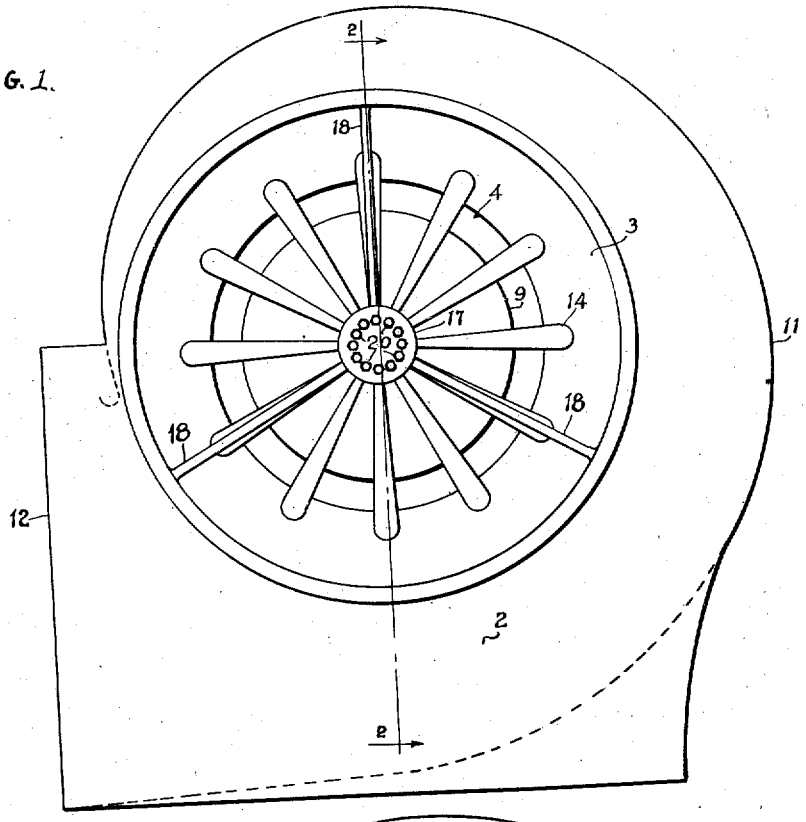
Figure 4:
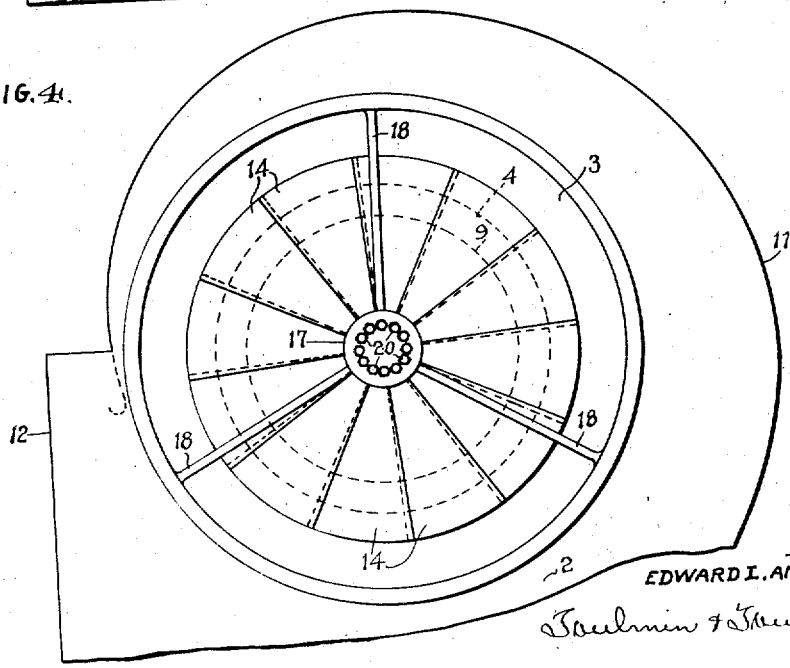
Figure 4 is a side elevation of the structure shown in Figure 1, but with the vanes of the device turned through a different angle.
Figure 2:
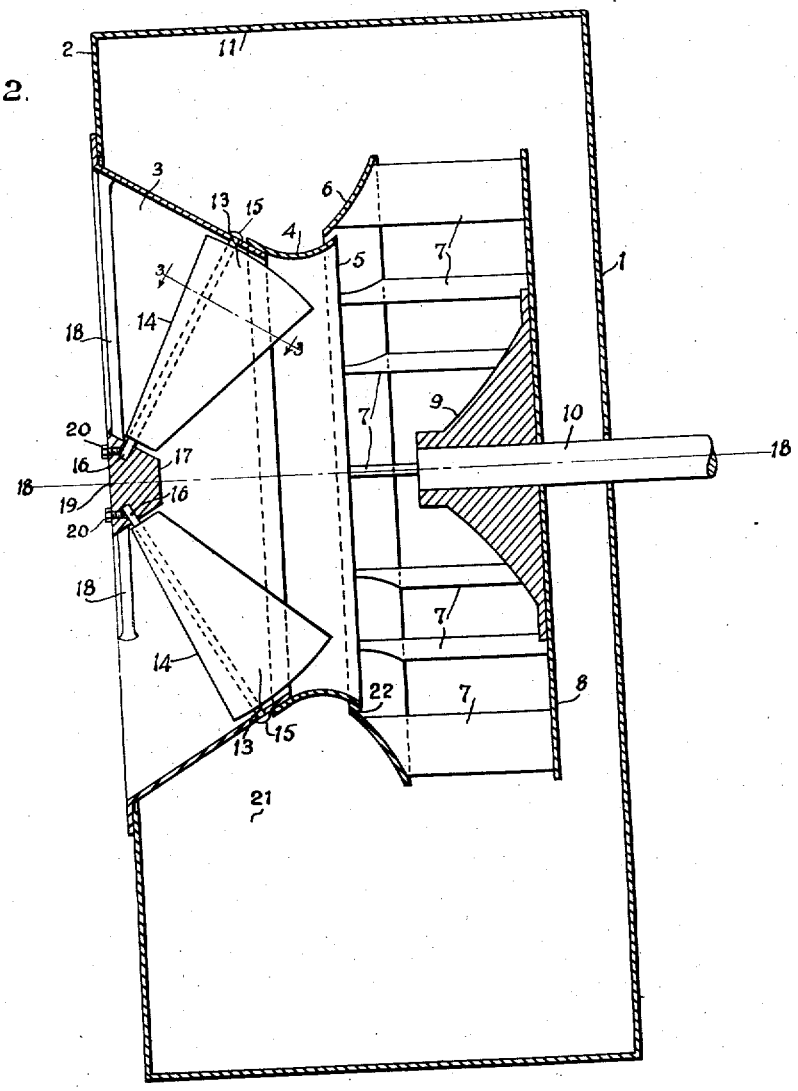
Figure 2 is a section of the line 2—2 of Figure 1.
Figure 3:
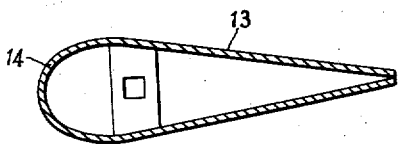
Figure 3 is a section of the line 3—3 of Figure 2.

Referring to the drawings in detail, 1 indicates the side wall of the casing; 2 indicates the other side wall of the casing in which is mounted the inlet Venturi shaped passageway member 3, having a flaring inner end 4, whose lip 5 is arranged within, and in spaced relationship to, the conical shroud 6 mounted on the inlet ends of the fan blades 7. These fan blades are supported at their other ends by the solid end plate 8, which in turn is mounted upon the hub 9 of the fan. This hub is carried upon the shaft 10 and is suitably driven by any desirable constant speed motor. The casing is further formed by the scroll 11 which joins the side walls. This scroll is provided with an outlet opening 12.

In the inlet opening formed by the Venturi shaped passageway 3, there is arranged a plurality of streamlined vanes of airfoil section such as 13. 14 designates the leading edges of these vanes. They are pivoted at 15 on the inlet casing 3, and at 16 on the hub 17 which is carried by the spider 18. The pivotal axis of these vanes 13 intersects with the horizontal axis of the inlet passageway and of the fan designated 18—18 as at 19. These fan blades may be adjusted in position in any desired manner. For instance, the hub in which they are pivoted may carry set screws 20, engaging the inner pivoted ends of these vanes to hold them in any desired position.

It will be noted that the longitudinal axes of the fan blades are substantially parallel to the axis 18—18 of the fan. The back pressure in the area 21 flows through the opening 22 between the bell-shaped mouth 4 and the shroud 6, thereby inducing a flow of air over that portion of the fan blades adjacent the shroud which ordinarily would have no incoming air to work upon by reason of turbulence, eddies and other similar conditions set up by back pressure.

Thus, an even distribution of air is secured at all settings of the vanes 13 so that the fan will operate at its maximum efficiency for the amount of air admitted to it.

The unbalanced mounting of the vanes together with their arcuate outer ends and inner adjustable ends makes it possible for the vanes to perform the dual function of directing the air with a whirling motion and of completely closing off the air or substantially closing it when that is desirable. By placing the adjusting means on the hub and the hub near the outer face of the blower, a convenient and satisfactory adjustment can be effected.

It is thus possible to control the volume of air as well as the direction of air with such vanes. It is possible to utilize the conical inlet without the Venturi throat, although it is preferable to combine the two. By arranging the axles 13 at right angles to the face of the conical inlet 3, the end 15 of the axles can be located adjacent the outlet end of the conical inlet 3 so that the vanes in open position can extend beyond the conical inlet to facilitate the directing of the air with a whirling motion. At the same time the inner ends 16 of the axles 13 can be mounted on a hub 17 adjacent the outer end of the conical inlet 3 at a convenient location for effecting the adjustment. This adjustment may be effected mechanically by the set screws 20 or by any means for adjusting the vanes simultaneously. The adjustment may be directly at the hub or may be from some remote point. In this manner both the volume and the direction of the air may be controlled. It may be controlled with the conical inlet only or in combination with a Venturi throat. By arranging the blades or vanes with a major portion of the vanes on one side as compared with the other with reference to the axle 13, it is possible to secure the maximum directing of the air in the direction desired into the blower casing with a minimum interference of the air as it flows over the vanes.

I desire to comprehend within my invention such modifications as may be clearly embraced within my claims and the scope of my invention.

Having thus fully described my invention, what I claim is new and desire to secure by Letters Patent, is:

1. In a blower, a casing, a fan therein, an inlet passageway, having inwardly tapering walls, air control vanes pivotally mounted on the walls of said passageway at right angles thereto, a Venturi shaped throat on the inner end of said passageway and projecting into said throat.

2. In a blower, a fan rotating therein, a Venturi-shaped inlet passageway having a restricted throat, a hub mounted in said passageway and diagonally-disposed vanes, each being pivotally mounted at its ends on said hub and the passageway wall respectively, said vanes having portions projecting into the Venturi throat of the passageway.

3. In combination in a blower, a blower casing and a blower rotor, a conical inlet, and a plurality of adjustable air controlling vanes mounted in said inlet on axes at right angles to the surface of said inlet, said vanes being so arranged that there is a greater area on one side of their axes of mounting than the other, said vanes extending beyond the end of said inlet into positions adjacent said rotor.

4. In combination in a blower, a blower casing and a blower rotor, a conical inlet, a plurality of adjustable air controlling vanes mounted in said inlet on axes at right angles to the surface of said inlet, said vanes being so arranged that there is a greater area on one side of their axes of mounting than the other, and means of adjusting the position of said vanes on their axes, said vanes extending beyond the end of said inlet into positions adjacent said rotor.

5. In a blower, the combination of a blower casing, a blower, a conical inlet, and a plurality of adjustable air controlling vanes mounted in said inlet, said vanes being adapted when in closed position to partially overlap one another to completely shut off the air passing through the inlet and when in open position to extend beyond the end of the inlet into positions substantially adjacent said blower for directing the air passing therethrough in said blower with a whirling motion.

6. In a blower, the combination of a blower casing, a blower, a conical inlet, a plurality of adjustable air controlling vanes mounted within said inlet, said vanes being adapted when in closed position to partially overlap one another to completely shut off the air passing through the inlet and when in open position to extend beyond the end of the inlet into positions substantially adjacent said blower for directing the air passing therethrough into said blower with a whirling motion, and means for adjusting said vanes and holding them in adjusted position.

7. In combination in a blower, a blower casing, a blower therein, a conical inlet, a Venturi throat mounted on the inner end of said inlet, and a plurality of adjustable guide vanes mounted in said inlet and adapted in open position to extend into said Venturi throat.

8. In combination in a blower, a blower casing, a blower therein, a conical inlet, a Venturi throat mounted on the inner end of said inlet, and a plurality of adjustable guide vanes mounted in said inlet and adapted in open position to extend into said Venturi throat, the axes of support of said guide vanes being arranged at right angles to the face of the conical inlet.

9. In combination, a blower having a blower casing and a fan therein, a conical inlet, a Venturi throat mounted on the inner end thereof, and a plurality of air controlling vanes mounted in said conical inlet at their outer ends and on a hub centrally located in the inlet on their inner ends.

10. In combination, a blower having a blower casing and a fan therein, a conical inlet, a Venturi throat mounted on the inner end thereof, a plurality of air controlling vanes mounted wholly in said conical inlet at their outer ends and on a hub centrally located in the inlet on their inner ends, and means to adjust the position of said vanes mounted on said hub.

EDWARD L. ANDERSON.